(12) United States Patent
Sakai

(10) Patent No.: US 9,542,017 B2
(45) Date of Patent: Jan. 10, 2017

(54) ILLUMINATION DISPLAY SWITCHING DEVICE

(71) Applicant: YAZAKI CORPORATION, Tokyo (JP)

(72) Inventor: Manabu Sakai, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/533,466

(22) Filed: Nov. 5, 2014

(65) Prior Publication Data

US 2015/0062098 A1      Mar. 5, 2015

Related U.S. Application Data

(63) Continuation of application No. PCT/JP2013/064418, filed on May 17, 2013.

(30) Foreign Application Priority Data

Jun. 5, 2012 (JP) ................................ 2012-128152

(51) Int. Cl.
*G06F 3/0362* (2013.01)
*B60Q 3/04* (2006.01)
(Continued)

(52) U.S. Cl.
CPC ............. *G06F 3/0362* (2013.01); *B29C 45/16* (2013.01); *B60Q 3/004* (2013.01); *B60Q 3/044* (2013.01);
(Continued)

(58) Field of Classification Search
CPC ....... G06F 3/0362; B60Q 3/004; B60Q 3/044; B29C 45/16; H01H 9/182; H01H 13/023; H01H 2219/064; H01H 2219/062; H01H 2231/026; H01H 2229/046; B29K 2995/0026; B29K 2995/0025
See application file for complete search history.

(56) References Cited

U.S. PATENT DOCUMENTS 4,163,883 A * 8/1979 Boulanger ............. H01H 13/83
200/314
4,225,766 A * 9/1980 Pfeifer ................... H01H 9/182
200/314
(Continued)

FOREIGN PATENT DOCUMENTS

DE    20 2009 003 843 U1    6/2009
EP       2 104 125 A1      9/2009
(Continued)

OTHER PUBLICATIONS

International Search Report and Written Opinion of the International Search Report for PCT/JP2013/064418 dated Aug. 16, 2013.
(Continued)

*Primary Examiner* — Dwayne Bost
*Assistant Examiner* — Ivelisse Martinez Quiles
(74) *Attorney, Agent, or Firm* — Kenealy Vaidya LLP

(57) ABSTRACT

An illumination display switching device includes a switch knob slidable with respect to a push button-type switch. The switch knob includes a display operation part including a display design and a non-display design, a lock arm that is vertically hung from a central portion of the display operation part and connected to the push button-type switch, a light guide member that is vertically hung from the display operation part positioned near the light source, and an interconnection light guide member that interconnects the light guide member, a base of the lock arm and the display design. The display design is illuminated from a backside by emission light of the light source through the light guide member and the interconnection light guide member. The lock arm, the light guide member and the interconnection
(Continued)

light guide member are integrally molded with the display design by the light-transmitting resin.

5 Claims, 7 Drawing Sheets

(51) Int. Cl.
*B60Q 3/00* (2006.01)
*H01H 9/18* (2006.01)
*H01H 13/02* (2006.01)
*B29C 45/16* (2006.01)

(52) U.S. Cl.
CPC .......... *H01H 9/182* (2013.01); *H01H 13/023* (2013.01); *B29K 2995/0025* (2013.01); *B29K 2995/0026* (2013.01); *H01H 2219/062* (2013.01); *H01H 2219/064* (2013.01); *H01H 2229/046* (2013.01); *H01H 2231/026* (2013.01)

(56) References Cited

U.S. PATENT DOCUMENTS

| | | | |
|---|---|---|---|
| 2005/0189205 A1* | 9/2005 | Fujii | H01H 9/182 200/314 |
| 2006/0102456 A1* | 5/2006 | Kajiwara | H01H 1/403 200/313 |
| 2009/0200475 A1* | 8/2009 | McMillan | G01N 13/02 250/370.01 |
| 2010/0314229 A1 | 12/2010 | Ominato | |
| 2011/0036693 A1* | 2/2011 | Lin | H01H 13/023 200/314 |
| 2012/0000757 A1* | 1/2012 | Ikeda | H01H 9/182 200/310 |

FOREIGN PATENT DOCUMENTS

| | | |
|---|---|---|
| GB | 2 168 850 A | 6/1986 |
| JP | 61-190627 U | 11/1986 |
| JP | 7-105783 A | 4/1995 |
| JP | 2000-173379 A | 6/2000 |
| JP | 2008-192407 A | 8/2008 |

OTHER PUBLICATIONS

Chinese Office Action for the related Chinese Patent Application No. 201380029965.7 dated May 17, 2016.
Japanese Office Action for the related Japanese Patent Application No. 2012-128152 dated Jan. 5, 2016.
Chinese Office Action for the related Chinese Patent Application No. 201380029965.7 dated Dec. 2, 2015.
Chinese Office Action for the related Chinese Patent Application No. 201380029965.7 dated Oct. 20, 2016.

* cited by examiner

FIG.7A
FIG.7B
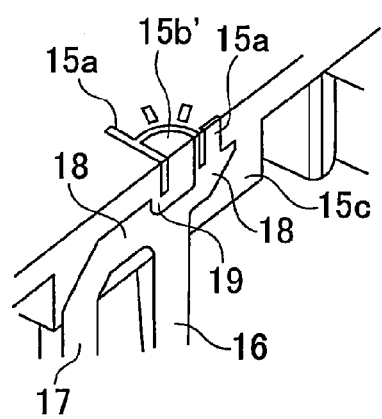
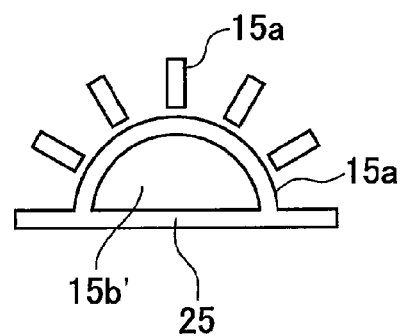

ILLUMINATION DISPLAY SWITCHING DEVICE

CROSS REFERENCE TO RELATED APPLICATIONS

This application is a continuation of PCT application No. PCT/JP2013/064418, which was filed on May 17, 2013 based on Japanese Patent Application No. 2012-128152 filed on Jun. 5, 2012, the contents of which are incorporated herein by reference.

BACKGROUND OF THE INVENTION

1. Field of the Invention

The present invention relates to an illumination display switching device, and more particularly, to an illumination display switching device that improves visibility by illuminating from a backside a display design such as letter, symbol, or figure, which is formed on a switch knob for operating a push button-type switch.

2. Description of the Related Art

As an example of the illumination display switching device, JP-A-2008-192407 suggests an illumination display switching device that is used for an operation switch of an air conditioner device, an audio device and the like of a vehicle. According to this device, a switch knob that is supported to be slidable in an operation direction of the switch and a push bar that protrudes from a backside of the switch knob are integrally molded with a transparent resin material, a leading end of the push bar is mounted with being contacted to an operation part of a push button-type switch and the switch knob is pushed to operate the push button-type switch. Also, in order to form a display design for identifying a type and the like of the switch such as letter, symbol, figure and the like on a display operation surface of the switch knob, the switch knob is molded with a light-transmitting resin and a part except for the display design is colored with a light-blocking paint so that the light is emitted through the display design only.

In particular, according to JP-A-2008-192407, the push button-type switch has a hollow cylindrical shape, a light emitting diode (LED) is accommodated in the cylinder to thus form a switch part on a cylindrical wall and an axis of the push bar operating the push button-type switch and molded with the transparent resin is matched with a center of the LED. According to this configuration, since a center of the operation of the switch knob and a central axis of the push button-type switch can be matched, a feeling (operation feeling) of the switch knob can be improved. Also, although a diameter of a part of the push bar, which is light-coupled to the LED, is small, a part that is connected to a display part of the switch knob is formed to have a cone-shaped enlarged part and an outer surface of the push bar is painted so as to suppress the internal light from leaking to the outside, thereby improving illumination performance of the display design.

As another example of the illumination display switching device, JP-A-2000-173379 discloses that a cylindrical switch knob, which is supported to a cylindrical attachment member to be slidable in an operation direction of a switch, is arranged above a push button-type switch and a light source. The switch knob has a disc-shaped upper part having a display design that is formed at an upper end of a hollow cylinder of the switch knob and is made of at least a light-transmitting material. A part except for the display design of the switch knob is covered by a light-blocking member, so that only the display design is illuminated to thereby improve the visibility. Meanwhile, the hollow cylinder of the switch knob is provided with a cylindrical light guide member inserted therein, which guides the light of the light source arranged just below the switch knob towards a display part, or is configured as an empty space. Also, a lower end of the hollow cylinder of the switch knob is formed at a part thereof with a protruding push part that operates the push button-type switch. Also, a spring that pushes up and maintains the switch knob is provided to abut on the lower end of the hollow cylinder.

SUMMARY OF THE INVENTION

However, according to the illumination display switching device disclosed in JP-A-2008-192407, the display operation part of the switch knob and the push bar having the cone-shaped enlarged part are integrally molded. Therefore, since there is a large thickness difference between the thin display operation part and the thick push part, a so-called sink mark may occur at the display operation part corresponding to the push bar. Regarding this, since the switch knob disclosed in JP-A-2000-173379 also has the cylindrical member that is molded integrally with the backside of the disc-shaped display operation part, the sink mark, which is caused due to non-uniform cooling of resin upon molding, may occur.

Also, the push bar that is a light guide member disclosed in JP-A-2008-192407 is enlarged into the cone shape from the light source towards the display design, thereby guiding the light over an entire area of the display design. However, since the display design is a letter, symbol or figure and it is not necessarily to illuminate the entire area including the display design, the light emission from the display design may be lowered.

An object of the present invention is to prevent a sink mark from occurring at a display operation part of a switch knob upon molding, to sufficiently emit light through a display design and to improve an operation feeling of the switch knob.

There is provided an illumination display switching device including: a board; a push button-type switch mounted on the board; a light source mounted on the board; and a switch knob that is supported to a frame member to be slidable in an operation direction of the push button-type switch, wherein the switch knob includes: a display operation part including a display design and a non-display design, wherein the display design is embedded from a surface to a backside of the display operation part to be molded with a light-transmitting resin, and the non-display design molded with an opaque resin surrounds the display design; a lock arm that is vertically hung from a central portion of the display operation part and has a leading end connected to a switch part of the push button-type switch; a light guide member that is vertically hung from the display operation part and has a leading end surface positioned in a vicinity of an light-emission surface of the light source; and an interconnection light guide member that interconnects the light guide member, a base of the lock arm at a side of the display operation part and the display design, wherein the display design is illuminated from a backside of the display operation part by emission light of the light source through the light guide member and the interconnection light guide member, wherein the lock arm, the light guide member and the interconnection light guide member are integrally molded with the display design by the light-transmitting resin.

That is, according to the above configuration, since the display design part of the switch knob and the light guide member and interconnection light guide member for guiding the light to the display design part are integrally molded with the light-transmitting resin and a non-display design part except for the display design part of the switch knob is integrally molded with the opaque resin, i.e., since they are molded with the resin by a twice molding, it is possible to reduce a thickness difference, thereby suppressing a sink mark from occurring. That is, the non-display design part is thin and the light guide member and the interconnection light guide member are thick. However, since they are divided and twice molded, a thickness difference thereof is small in each molding, so that it is possible to suppress a sink mark from occurring.

Also, since the lock arm that is vertically hung from the center of the display operation part of the switch knob is provided and the leading end thereof is connected to the switch part of the push button-type switch, a reactive force that is caused when pushing an operation surface of the switch knob is applied from an exact opposite direction. As a result, it is possible to favorably make a switch operation feeling. An axis of the lock arm is formed so that it is substantially matched with a center of an operation surface of the switch knob and an operation axis of the push button-type switch.

The illumination display switching device may be configured so that the light guide member, the base of the lock arm and the interconnection light guide member are embedded in an opaque resin layer of the non-display design. That is, for example, the light that is incident into the light guide member from the light source transmits vertically along the light guide member and is then incident into the interconnection light guide member. However, since the lock arm is positioned at the center of the display operation surface, a position of the light guide member deviates in a transverse direction as regards the display design part. Therefore, the interconnection light guide member is transversely bent so as to guide the light, which is incident from the light guide member, to the display design part. Therefore, since the light that is guided to the interconnection light guide member has various angle components, the light is much leaked from a side surface of the interconnection light guide member to an outside. Regarding this, when the interconnection light guide member is embedded in the opaque resin layer, the light is reflected on an inner surface (boundary surface with the opaque resin layer) of the interconnection light guide member and is thus returned inwards, so that it is possible to reduce the light to be leaked. As a result, the light that is guided to the display design part is increased, so that the illuminance is improved.

The illumination display switching device may be configured so that the interconnection light guide member has a plurality of light guide member inner surfaces having different angles formed therein to guide light incident from the light guide member to the display design. According to this configuration, for example, the light that is incident into the light guide member from the light source transmits vertically along the light guide member and is then incident into the interconnection light guide member. However, since the lock arm is positioned at the center of the display operation surface, a position of the light guide member deviates in a transverse direction as regards the display design part. Therefore, the interconnection light guide member should be transversely bent so as to guide the light, which is incident from the light guide member, to the display design part. Therefore, the interconnection light guide member is formed with a plurality of light guide inner surfaces having different angles, so that the light is reflected on the inner surfaces and is then guided to the display design part. For example, a corner part having a connection angle of the vertical light guide member and the interconnection light guide member horizontally extending is formed with a reflection surface that intersects with central axes of the two light guide members at an angle of 45°. Likewise, considering the position and shape of the display design part and the position and shape of a base end portion of the lock arm, reflection surfaces having a plurality of angles are formed on the inner surface of the interconnection light guide member that is integrally molded with the display design part and lock arm.

According to the present invention, it is possible to prevent a sink mark from occurring at the display operation part of the switch knob upon molding, to sufficiently emit the light through the display design and to improve an operation feeling of the switch knob.

BRIEF DESCRIPTION OF THE DRAWINGS

FIG. 7A is a cross-sectional view of a switch knob of the second embodiment.

FIG. 7B illustrates an effect of the second embodiment.

DETAILED DESCRIPTION OF THE EXEMPLARY EMBODIMENTS

Hereinafter, an illumination display switching device of the present invention will be exemplified with reference to embodiments.

First Embodiment

Figure 3:
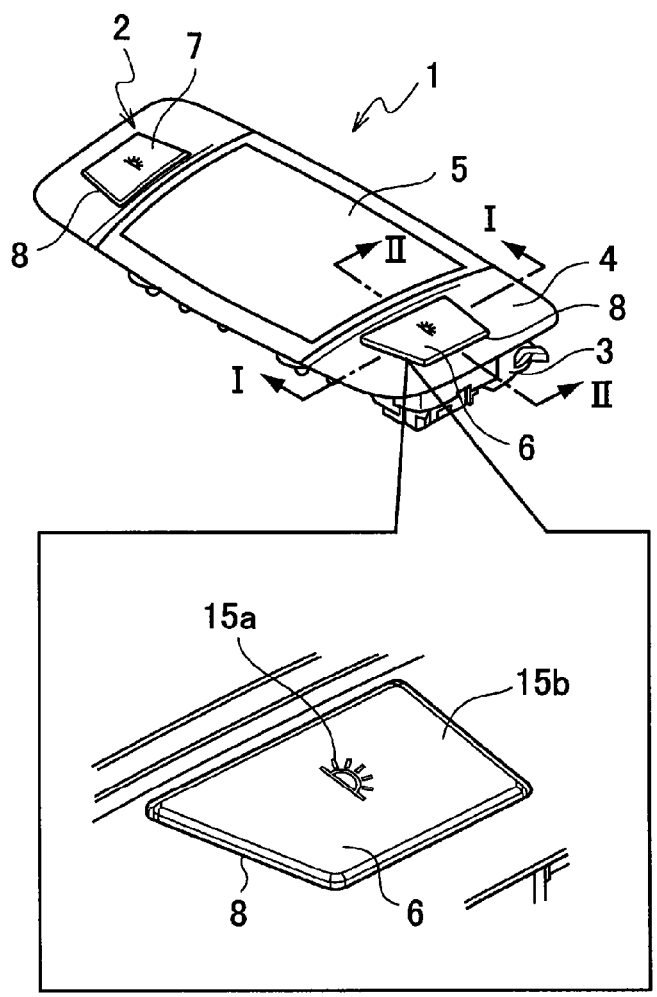
FIG. 3 is a perspective view of an example of an interior light to which the first embodiment is applied.

A first embodiment of the illumination display switching device of the present invention is described with reference to FIGS. 1 to 4. The first embodiment is applied to an illumination display switching device 2 of an interior light 1 shown in FIG. 3. However, the present invention is not limited thereto and can be applied to any illumination display switching device, irrespective of uses thereof, insomuch as it is an illumination display switching device that improves the visibility by illuminating from a backside a display design part such as letter, symbol, or figure, which is formed on a switch knob operating a push button-type switch. In FIG. 3, the interior light 1 includes a bezel 4 having a backside on which a housing 3 accommodating therein illumination lights (for example, right and left illumination lights) (not shown) and a wiring board is attached, and a lens 5 that is mounted on a surface-side of the bezel 4. A left switch knob 6 and a right switch knob 7 of the illumination display switching device 2 are mounted in openings 8 formed on the bezel 4. Since the switch knob 6 and the switch knob 7 are symmetrically formed, this embodiment is described by taking the illumination display switching device 2 of the switch knob 6 as example.

Figure 1:
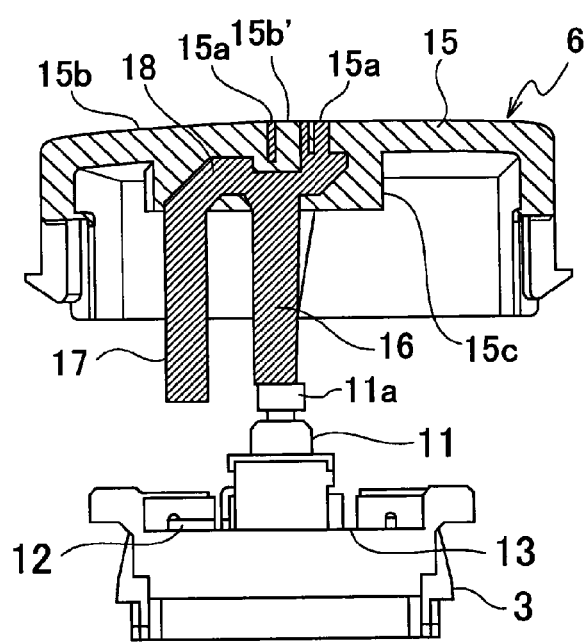
FIG. 1 is a cross-sectional view of a first embodiment of an illumination display switching device of the present invention, which is seen from an arrow I-I direction in FIG. 3.
Figure 2:
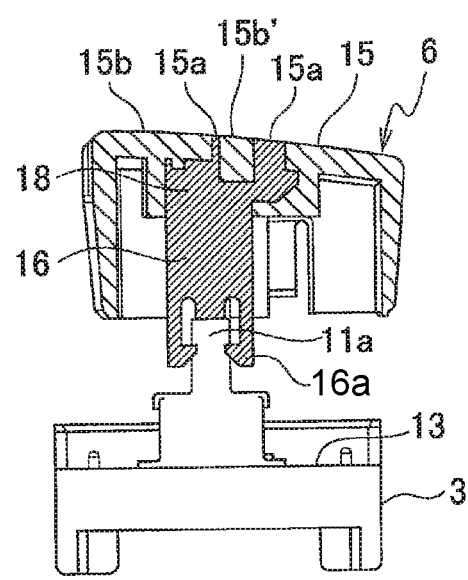
FIG. 2 is a cross-sectional view of the first embodiment, which is seen from an arrow II-II direction in FIG. 3.

As shown in FIG. 1, a board 13 having a push button-type switch 11 and a light source 12 mounted thereon is accommodated in the housing 3. In the meantime, FIG. 1 is a cross-sectional view seen from an arrow I-I direction of FIG. 3. In FIG. 1, the switch knob 6 having a cap shape is supported to the bezel 4 so that it can be slid in an operation direction (upper-lower direction in FIG. 1) of the push button-type switch 11, above the push button-type switch 11 and the light source 12. A display operation part 15 to be pushed of the switch knob 6 is exposed to be flush with an outer surface of the bezel 4 and a display design part such as letter, symbol, or figure is formed on the display operation part 15. In the first embodiment, the display design part is formed by embedding an illumination mark 15a from a surface to a backside of the display operation part 15 with a light-transmitting resin, as shown in FIG. 3. A non-display design part 15b except for the illumination mark 15a of the display operation part 15 surrounds the illumination mark 15a and is molded with an opaque resin.

The switch knob 6 is formed with a lock arm 16 that is vertically hung from a central portion of the display operation part 15. A leading end of the lock arm 16 is provided to abut on a switch part 11a of the push button-type switch 11 and an engaging claw 16a formed at the leading end is engaged on a side surface of the switch part 11a. Also, a rod-shaped light guide member 17 that is vertically hung from a position spaced from the central portion of the display operation part 15 is formed. A leading end surface of the light guide member 17 is opposed to an emission surface of the light source 12 formed with an LED and the like. A base part of the lock arm 16 and a base part of the light guide member 17 are respectively connected and integrally molded to and with an interconnection light guide member 18. The interconnection light guide member 18 is connected and integrally molded to and with the illumination mark 15a that is the display design part. The lock arm 16, the light guide member 17 and the interconnection light guide member 18 are integrally molded with the illumination mark 15a by using a light-transmitting resin. Also, the light guide member 17, the base part of the lock arm 16 and the interconnection light guide member 18 are embedded in an opaque resin layer 15c of the non-display design part 15b.

Figure 4:
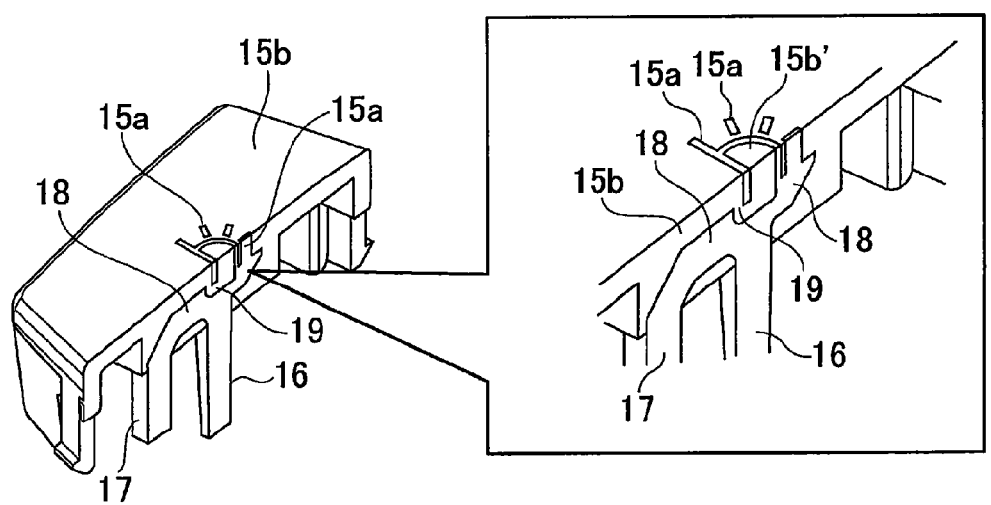
FIG. 4 is a perspective view showing a cut state of a switch knob of the first embodiment.

The switch knob 6 of this embodiment is formed by a twice molding in which the illumination mark 15a and the non-display design part 15b except for the illumination mark 15a are divided and formed using the light-transmitting resin and the opaque resin, i.e., by a so-called two-color molding. In case of the two-color molding, it may be necessary to mold a solitary island 15b' in the non-display design part 15b by a shape and the like of the display design part, which is the illumination mark 15a, as shown in FIG. 4. In this case, as shown in FIG. 4, a bypass route with which the non-display design part 15b and the solitary island 15b', which are molded with the same opaque resin, communicate with each other is provided in a molding tool. Thereby, although the opaque resin can be embedded in the solitary island 15b', a bypass part 19 whose opaque resin remains in the bypass route is formed.

According to the first embodiment, since the illumination mark 15a that is formed on the display operation part 15 of the switch knob 6, the lock arm 16 that connects the display operation part 15 to the switch part 11a and the light guide member 17 and interconnection light guide member 18 for guiding the light to the illumination mark 15a are integrally molded with the light-transmitting resin and the non-display design part 15b except for the illumination mark 15a of the switch knob 6 is integrally molded with the opaque resin, i.e., since they are formed by the twice molding, it is possible to reduce a thickness difference, thereby suppressing a sink mark from occurring. That is, the non-display design part 15b is thin and the illumination mark 15a, the lock arm 16, the light guide member 17 and the interconnection light guide member 18 are thick. However, since they are divided and twice molded, a thickness difference thereof is small in each molding, so that it is possible to suppress a sink mark from occurring.

Also, in the first embodiment, an axis of the lock arm 16 is substantially matched with the center of the display operation part 15 and an operation axis of the push button-type switch 11. Thus, since a reactive force that is caused when pushing the display operation part 15 of the switch knob 6 is applied from an exact opposite direction, it is possible to favorably make a switch operation feeling.

Figure 5:
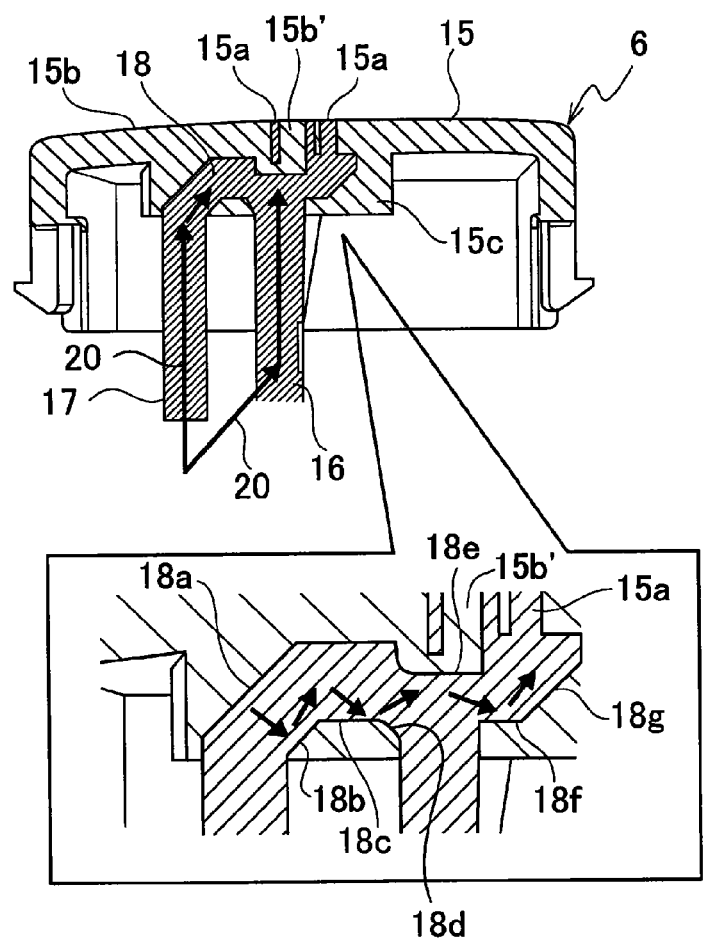
FIG. 5 illustrates a light guide operation of the first embodiment.

Also, according to the first embodiment, as shown in FIG. 5, emission light 20 from the light source 12 is incident from a lower end surface of the light guide member 17, passes through the light guide member 17 and the interconnection light guide member 18 and is then guided to the illumination mark 15a, so that the illumination mark 15a emits the light and the visibility thereof can be thus improved. Also, a part of the emission light 20 from the light source 12 is incident into the lock arm 16 from a side surface of the lock arm 16 made of the light-transmitting resin, passes through the lock arm 16 and the interconnection light guide member 18 and is then guided to the illumination mark 15a. Thereby, the light emission illuminance of the illumination mark 15a is increased, so that the visibility thereof can be improved.

Also, according to the first embodiment, the emission light 20 from the light source 12 may be leaked mainly from the interconnection light guide member 18 to the outside while it is incident into the interconnection light guide member 18 from the light guide member 17. Regarding this, since the light guide member 17, the base part of the lock arm 16 and the interconnection light guide member 18 are embedded in the opaque resin layer 15c of the non-display design part 15b, the emission light is guided to the illumination mark 15a while it is repeatedly reflected at a boundary face between the interconnection light guide member 18 and the opaque resin layer 15c. Thereby, the illumination mark 15a emits the light, so that the visibility thereof can be improved.

More specifically, for example, the light that is incident into the light guide member 17 from the light source 12 transmits vertically along the light guide member 17 and is then incident into the interconnection light guide member 18. Since the lock arm 16 is positioned at the center of the display operation part 15, a position of the light guide member 17 deviates in a transverse direction as regards the illumination mark 15a that is the display design. Therefore, it is necessary to transversely bend the light, which is incident from the light guide member 17, at a right angle by the interconnection light guide member 18. Also, in order to guide the light to the illumination mark 15a, it is necessary to upward bend the light at a right angle by the interconnection light guide member 18. Hence, since the light passing through the interconnection light guide member 18 has various angle components, the light is much leaked from the side surface of the interconnection light guide member 18 to the outside. Regarding this, when the interconnection light guide member 18 is embedded in the opaque resin layer 15c, the light is reflected on an inner surface of the interconnection light guide member 18 and is thus returned inwards, so that it is possible to reduce the light to be leaked.

Therefore, in the first embodiment, as shown in FIG. 5, the interconnection light guide member 18 is formed with a plurality of light guide member inner surfaces 18a to 18g having different angles so that the light incident from the light guide member 17 is guided to the illumination mark 15a. According to this configuration, for example, the light incident into the light guide member 17 from the light source 12 transmits vertically along the light guide member 17 and is then incident into the interconnection light guide member 18. Since the interconnection light guide member 18 is formed with the light guide member inner surfaces 18a to 18g having different angles, the incident light is repeatedly reflected on the inner surfaces 18a to 18g and is then guided to the illumination mark 15a. For example, a corner part having a connection angle of the vertical light guide member 17 and the interconnection light guide member 18 horizontally extending is formed with the light guide member inner surface 18a that intersects with central axes of the two light guide members at an angle of 45°. Likewise, considering the position and shape of the illumination mark 15a and the position and shape of the base end portion of the lock arm 16, the light guide member inner surfaces 18b to 18g having a plurality of angles are formed on the inner surface of the interconnection light guide member 18 that is integrally molded with the illumination mark and lock arm. Like this, according to the first embodiment, it is possible to improve the light emission illuminance of the illumination mark 15a.

Second Embodiment

Figure 6:
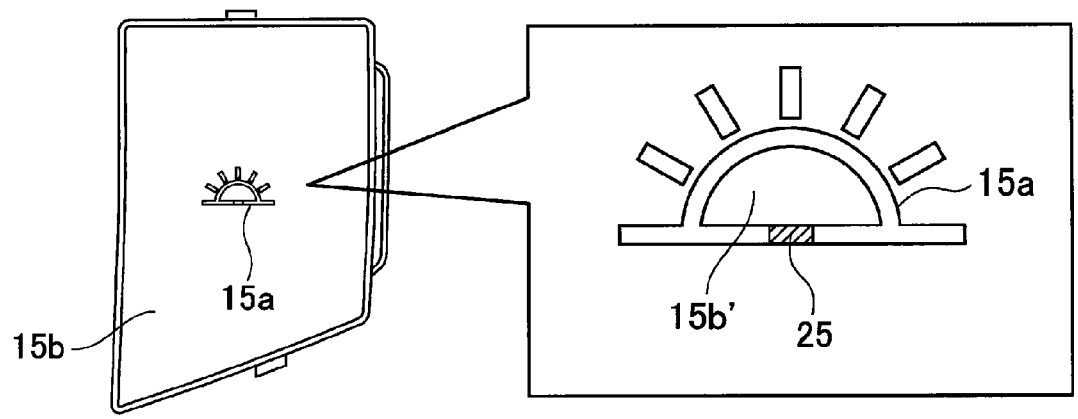
FIG. 6 illustrates a problem to be solved by a second embodiment.

A second embodiment of the illumination display switching device of the present invention is described with reference to FIGS. 6, 7A and 7B. The second embodiment is different from the first embodiment, in that a problem, which is caused due to the bypass part 19 molded with the opaque resin in the first embodiment, is solved. That is, as shown in FIG. 6, a part 25 of the illumination mark 15a becomes a shade of the light source 12 due to the bypass part 19, so that non-uniformity of the light occurs. In order to solve this problem, as shown in FIG. 7A, a light-diffusing material is put in the light-transmitting resin for molding the illumination mark 15a. Thereby, the light is scattered to the part 25 of the illumination mark 15a becoming a shade of the bypass part 19, too, so that the non-uniformity of the light in the illumination mark 15a is not seen, as shown in FIG. 7B.

According to the illumination display switching device, it is possible to prevent a sink mark from occurring at the display operation part of the switch knob upon molding, to sufficiently emit the light through the display design and to improve an operation feeling of the switch knob.

What is claimed is:

1. An illumination display switching device comprising:
   a board;
   a push button-type switch mounted on the board;
   a light source mounted on the board; and
   a switch knob that is supported to a frame member to be slidable in an operation direction of the push button-type switch, wherein the switch knob includes:
   a display operation part including a display design and a non-display design, wherein the display design is embedded from a surface to a backside of the display operation part to be molded with a light-transmitting resin, and the non-display design molded with an opaque resin surrounds the display design;
   a lock arm that is vertically hung from a central portion of the display operation part and has a leading end connected to a switch part of the push button-type switch;
   a light guide member that is vertically hung from the display operation part and has a leading end surface positioned in a vicinity of an light-emission surface of the light source; and
   an interconnection light guide member that interconnects a base part of the light guide member and a base part of the lock arm at a side of the display operation part and the display design, wherein the display design is illuminated from a backside of the display operation part by emission light of the light source through the light guide member and the interconnection light guide member, wherein
the lock arm, the light guide member and the interconnection light guide member are integrally molded with the display design by the light-transmitting resin,
wherein the interconnection light guide member is embedded in an opaque resin layer of the non-display design so as to cause the emission light of the light source to be repeatedly reflected at a boundary face between the interconnection light guide member and the opaque resin layer and to be guided to the display design, and
wherein the interconnection light guide member is embedded in the opaque resin layer such that the opaque resin layer engages all surfaces of the interconnection light guide member.

2. The illumination display switching device according to claim 1, wherein the base part of the light guide member and the base part of the lock arm are embedded in the opaque resin layer of the non-display design.

3. The illumination display switching device according to claim 1, wherein the lock arm is formed to match an arm axis of the lock arm substantially with a center of the display operation part and an operation axis of the push button-type switch.

4. The illumination display switching device according to claim 1, wherein the interconnection light guide member has a plurality of light guide member inner surfaces having different angles formed therein to guide light incident from the light guide member to the display design.

5. The illumination display switching device according to claim 1, wherein the interconnection light guide member includes a first inner surface having a first angle with respect to an axis of the light guide member and a second inner surface having a second angle that is different than the first angle with respect to the axis of the light guide member.

\* \* \* \* \*